(12) United States Patent
Smirnov et al.

(10) Patent No.: US 8,099,487 B1
(45) Date of Patent: Jan. 17, 2012

(54) SYSTEMS AND METHODS FOR DETERMINING PLACEMENT OF VIRTUAL MACHINES

(75) Inventors: George Smirnov, Littleton, MA (US); Kenneth Hu, Littleton, MA (US); David Kaeli, Littleton, MA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 12/893,937

(22) Filed: Sep. 29, 2010

Related U.S. Application Data

(63) Continuation-in-part of application No. 11/773,825, filed on Jul. 5, 2007, now abandoned.

(60) Provisional application No. 61/247,287, filed on Sep. 30, 2009, provisional application No. 60/806,699, filed on Jul. 6, 2006.

(51) Int. Cl.
*G06F 15/173* (2006.01)
*G06F 9/455* (2006.01)

(52) U.S. Cl. .............................. 709/223; 709/226; 718/1

(58) Field of Classification Search .................. 709/238, 709/216, 224, 226, 223; 718/1
See application file for complete search history.

(56) References Cited

U.S. PATENT DOCUMENTS

| | | | |
|---|---|---|---|
| 6,795,966 B1 | 9/2004 | Lim | |
| 7,318,136 B2 | 1/2008 | Fujibayashi | |
| 7,805,516 B2 * | 9/2010 | Kettler et al. | 709/226 |
| 2009/0228589 A1 * | 9/2009 | Korupolu | 709/226 |
| 2009/0254660 A1 * | 10/2009 | Hanson et al. | 709/226 |
| 2009/0293022 A1 * | 11/2009 | Fries | 716/2 |
| 2010/0107162 A1 * | 4/2010 | Edwards et al. | 718/1 |
| 2010/0115049 A1 * | 5/2010 | Matsunaga et al. | 709/216 |
| 2010/0180275 A1 * | 7/2010 | Neogi et al. | 718/1 |
| 2010/0211956 A1 * | 8/2010 | Gopisetty et al. | 718/104 |
| 2010/0262974 A1 * | 10/2010 | Uyeda | 718/105 |
| 2010/0325273 A1 * | 12/2010 | Kudo | 709/224 |
| 2011/0191477 A1 * | 8/2011 | Zhang et al. | 709/226 |

* cited by examiner

*Primary Examiner* — Aaron Strange
(74) *Attorney, Agent, or Firm* — Jacobs & Kim LLP; David Jacobs

(57) ABSTRACT

Systems and methods are provided for determining an optimized placement for a virtual machine in a virtualized environment on the basis of available performance metrics, in which the virtualized environment includes at least two virtual machines, each hosting at least one application, and at least one virtualized hardware system managed by at least one virtualization server.

17 Claims, 17 Drawing Sheets

160a

| | Column 1 | Column 2 | Column 3 | Column 4 | Column 5 | |
|---|---|---|---|---|---|---|
| VMMA | 29 | 19 | 5 | 8 | 32 | Row 1 |
| VMMB | 10 | 1 | 15 | 20 | 25 | Row 2 |

160b                  Balance

| | | |
|---|---|---|
| VMMA | 29 + 19 + 5 + 8 + 32 = 93 | Row 1 |
| VMMB | 10 + 1 + 15 + 20 + 25 = 71 | Row 2 |

160c

| | Column 1 | Column 2 | Column 3 | Column 4 | Column 5 | Column 6 | |
|---|---|---|---|---|---|---|---|
| VMMA | 29 | 19 | 5 | 8 | 32 | 0 | Row 1 |
| VMMB | 10 | 1 | 15 | 20 | 25 | 0 | Row 2 |

FIG. 6

| 160d | Column 1 | Column 2 | Column 3 | Column 4 | Column 5 | Column 6 | |
|---|---|---|---|---|---|---|---|
| VMMA | 19 | 32 | 29 | 0 | 8 | 5 | Row 1 |
| VMMB | 1 | 25 | 10 | 0 | 20 | 15 | Row 2 |

| 160e | Column 1 | Column 2 | Column 3 | Column 4 | Column 5 | Column 6 | |
|---|---|---|---|---|---|---|---|
| VMMA | 1 | 32 | 29 | 0 | 8 | 5 | Row 1 |
| VMMB | 19 | 25 | 10 | 0 | 20 | 15 | Row 2 |

| 160f | Column 1 | Column 2 | Column 3 | Column 4 | Column 5 | |
|---|---|---|---|---|---|---|
| VMMA | 1 + 32 = 33 | 29 | 0 | 8 | 5 | Row 1 |
| VMMB | 19 + 25 = 44 | 10 | 0 | 20 | 15 | Row 2 |

| | Column 1 | Column 2 | Column 3 | Column 4 | |
|---|---|---|---|---|---|
| VMMA | (1 + 32) + 29 = 62 | 0 | 8 | 5 | Row 1 |
| VMMB | (19 + 25) + 10 = 54 | 0 | 20 | 15 | Row 2 |

160h

| | Column 1 | Column 2 | Column 3 | Column 4 | |
|---|---|---|---|---|---|
| VMMA | (19 + 25) + 10 = 54 | 0 | 8 | 5 | Row 1 |
| VMMB | (1 + 32) + 29 = 62 | 0 | 20 | 15 | Row 2 |

160i

| | Column 1 | Column 2 | Column 3 | |
|---|---|---|---|---|
| VMMA | (19 + 25 + 10) + 0 = 54 | 8 | 5 | Row 1 |
| VMMB | (1 + 32 + 29) + 0 = 62 | 20 | 15 | Row 2 |

160j

| | Column 1 | Column 2 | Column 3 | |
|---|---|---|---|---|
| VMMA | (19 + 25 + 10) + 0 = 54 | 20 | 5 | Row 1 |
| VMMB | (1 + 32 + 29) + 0 = 62 | 8 | 15 | Row 2 |

FIG. 8

| 160k | Column 1 | Column 2 | |
|---|---|---|---|
| VMMA | (19 + 25 + 10 + 0) + 20 = 74 | 5 | Row 1 |
| VMMB | (1 + 32 + 29 + 0) + 8 = 70 | 15 | Row 2 |

| 160l | Column 1 | Column 2 | |
|---|---|---|---|
| VMMA | (1 + 32 + 29 + 0) + 8 = 70 | 15 | Row 1 |
| VMMB | (19 + 25 + 10 + 0) + 20 = 74 | 5 | Row 2 |

| 160m | Balance | |
|---|---|---|
| VMMA | (1 + 32 + 29 + 0 + 8) + 15 = 85 | Row 1 |
| VMMB | (19 + 25 + 10 + 0 + 20) + 5 = 79 | Row 2 |

| | Column 1 | Column 2 | Column 3 | Column 4 | Column 5 | Column 6 | |
|---|---|---|---|---|---|---|---|
| VMMA | 1 | 32 | 29 | 0 | 8 | 15 | Row 1 |
| VMMB | 19 | 25 | 10 | 0 | 20 | 5 | Row 2 |

160o

| | Column 1 | Column 2 | Column 3 | Column 4 | Column 5 | Column 6 | |
|---|---|---|---|---|---|---|---|
| VMMA | 25 | 32 | 29 | 0 | 8 | 15 | Row 1 |
| VMMB | 19 | 1 | 10 | 0 | 20 | 5 | Row 2 |

160p Balance

| | | |
|---|---|---|
| VMMA | 25 + 32 + 29 + 0 + 8 + 15 = 109 | Row 1 |
| VMMB | 19 + 1 + 10 + 0 + 20 + 5 = 55 | Row 2 |

| | Column 1 | Column 2 | Column 3 | Column 4 | Column 5 | Column 6 | |
|---|---|---|---|---|---|---|---|
| VMMA | 1 | 19 | 29 | 0 | 8 | 15 | Row 1 |
| VMMB | 32 | 25 | 10 | 0 | 20 | 5 | Row 2 |

160r

Balance

| | | |
|---|---|---|
| VMMA | 1 + 19 + 29 + 0 + 8 + 15 = 72 | Row 1 |
| VMMB | 32 + 25 + 10 + 0 + 20 + 5 = 92 | Row 2 |

160s

| | Column 1 | Column 2 | Column 3 | Column 4 | Column 5 | Column 6 | |
|---|---|---|---|---|---|---|---|
| VMMA | 10 | 32 | 29 | 0 | 8 | 15 | Row 1 |
| VMMB | 19 | 25 | 1 | 0 | 20 | 5 | Row 2 |

Balance

| VMMA | 10 + 32 + 29 + 0 + 8 + 15 = 94 | Row 1 |
|---|---|---|
| VMMB | 19 + 25 + 1 + 0 + 20 + 5 = 70 | Row 2 |

160u

| | Column 1 | Column 2 | Column 3 | Column 4 | Column 5 | Column 6 | |
|---|---|---|---|---|---|---|---|
| VMMA | 1 | 32 | 25 | 0 | 8 | 15 | Row 1 |
| VMMB | 19 | 29 | 10 | 0 | 20 | 5 | Row 2 |

160v

Balance

| VMMA | 1 + 32 + 25 + 0 + 8 + 15 = 81 | Row 1 |
|---|---|---|
| VMMB | 19 + 29 + 1 + 10 + 20 + 5 = 83 | Row 2 |

FIG. 12

| 160w | Column 1 | Column 2 | Column 3 | Column 4 | Column 5 | Column 6 | |
|---|---|---|---|---|---|---|---|
| VMMA | 1 | 32 | 25 | 0 | 8 | 15 | Row 1 |
| VMMB | 19 | 29 | 10 | 0 | 20 | 5 | Row 2 |

| 160x | Column 1 | Column 2 | Column 3 | Column 4 | Column 5 | Column 6 | |
|---|---|---|---|---|---|---|---|
| VMMA | 0 | 32 | 25 | 0 | 5 | 20 | Row 1 |
| VMMB | 19 | 29 | 10 | 1 | 15 | 8 | Row 2 |

| 160y | Balance | |
|---|---|---|
| VMMA | 0 + 32 + 25 + 0 + 5 + 20 = 82 | Row 1 |
| VMMB | 19 + 29 + 10 + 1 + 15 + 8 = 82 | Row 2 |

|  | Column 1 | Column 2 | Column 3 | Column 4 | Column 5 | Column 6 |  |
|---|---|---|---|---|---|---|---|
| VMMA | 0 | 32 | 25 | 0 | 5 | 20 | Row 1 |
| VMMB | 19 | 29 | 10 | 1 | 15 | 8 | Row 2 |

181

| VM1 | VM2 | VM3 | VM4 | VM5 |
|---|---|---|---|---|
| VMMA | | | | |

| VM6 | VM7 | VM8 | VM9 | VM10 |
|---|---|---|---|---|
| VMMB | | | | |

182

| VM3 | VM5 | VM9 | VM10 |
|---|---|---|---|
| VMMA | | | |

| VM1 | VM2 | VM4 | VM6 | VM7 | VM8 |
|---|---|---|---|---|---|
| VMMB | | | | | |

FIG. 14

```
                              START
                                │
                                ▼                                    200
┌─────────────────────────────────────────────────────────────────────┐
│ 201. DETERMINE VIRTUAL MACHINE PLACEMENT BASED ON                   │
│ MEASUREMENT OF PERFORMANCE OR UTILIZATION OR OTHER SELECTED         │
│ VALUES OF THE AT LEAST ONE VIRTUALIZED COMPUTING SYSTEM OR          │
│ COMPONENTS OF THE AT LEAST ONE VIRTUALIZED COMPUTING SYSTEM.        │
│                                                                     │
│     (DETERMINING OF VIRTUAL MACHINE PLACEMENT INCLUDES              │
│     DETERMINING SELECTED BALANCE OF PROGRAM EXECUTION ON            │
│     SELECTED RESOURCES IN THE AT LEAST ONE VIRTUALIZED              │
│     COMPUTING SYSTEM, OR A SELECTED BALANCE OF ANOTHER              │
│     SELECTED PARAMETER ASSOCIATED WITH SELECTED RESOURCES           │
│     IN THE AT LEAST ONE VIRTUALIZED COMPUTING SYSTEM.)              │
│                                                                     │
│     (DETERMINING SELECTED BALANCE IS BASED ON ANY OF                │
│     UTILIZATION, THROUGHPUT, OR OTHER MEASUREMENTS, AND             │
│     DETECTED CAPACITY TO MOVE VIRTUAL MACHINES ASSOCIATED           │
│     WITH AT LEAST ONE PHYSICAL COMPUTING SYSTEM ASSOCIATED          │
│     WITH THE AT LEAST ONE VIRTUALIZED COMPUTING SYSTEM.)            │
│                                                                     │
│     (MEASUREMENTS CAN INCLUDE MEASUREMENTS OF AT LEAST ONE          │
│     SELECTED RESOURCE, INCLUDING ONE OR MORE OF CPU                 │
│     UTILIZATION, MEMORY UTILIZATION, NETWORK BANDWIDTH, I/O         │
│     STORAGE BANDWIDTH, OR OTHER SELECTED PARAMETERS.)               │
│                                                                     │
│     (DETERMINING OF VIRTUAL MACHINE PLACEMENT CAN INCLUDE           │
│     UTILIZING SELECTED OPTIMIZATION ALGORITHM.)                     │
│                                                                     │
│     (OPTIMIZATION ALGORITHM CAN BE A GREEDY ALGORITHM, SUCH AS      │
│     THAT SHOWN IN FIG. 16.)                                         │
└─────────────────────────────────────────────────────────────────────┘
                                │
                                ▼
                              ( 15B )
```

202. ASSIGN OR REASSIGN VIRTUAL MACHINES TO INDIVIDUAL ELEMENTS OF THE COMPUTING SYSTEM, TO PROVIDE IMPROVED BALANCE ACROSS THE AT LEAST ONE VIRTUALIZED COMPUTING SYSTEM, BASED ON SELECTED UTILIZATION OR THROUGHPUT VALUES, OR OTHER SELECTED VALUES.

(INDIVIDUAL ELEMENTS CAN INCLUDE ANY OF STORAGE ADAPTERS, PROCESSORS, OR SWITCH PORTS.)

203. ADJUST OR TUNE VIRTUAL MACHINE PLACEMENT BASED ON SELECTED UTILIZATION OR THROUGHPUT VALUES, OR OTHER SELECTED VALUES.

(UTILIZATION OR THROUGHPUT VALUES CAN INCLUDE USE OF ANY OF PROCESSORS, MEMORY, NETWORKS AND INPUT/OUTPUT RESOURCES.)

FIG. 15B

SYSTEMS AND METHODS FOR DETERMINING PLACEMENT OF VIRTUAL MACHINES

PRIORITY CLAIM AND CROSS-REFERENCE TO RELATED APPLICATIONS

The present patent application claims the priority benefit of U.S. Provisional Pat. App. 61/247,287 filed Sep. 30, 2009.

The present application is a continuation-in-part of U.S. patent application Ser. No. 11/773,825 filed Jul. 5, 2007, entitled "Managing Application System Load," which claims the priority benefit of U.S. Provisional Pat. App. 60/806,699 filed Jul. 6, 2006.

Each of the above-listed applications is incorporated herein by reference. Also incorporated herein by reference in their entireties are each of the following:

U.S. patent application Ser. No. 11/961,186 filed Dec. 20, 2007, entitled "Methods and Systems for Identifying Application System Storage Resources", which claims the priority benefit of U.S. Provisional Pat. App. 60/871,444 filed Dec. 21, 2006; and U.S. patent application Ser. No. 12/808,043 filed Jun. 14, 2010, entitled "Evaluating And Predicting Computer System Performance Using Kneepoint Analysis," which is a national stage entry of PCT/US08/88062 filed Dec. 22, 2008, which claims priority from U.S. Provisional Pat. App. 61/015,615 filed Dec. 20, 2007.

FIELD OF THE INVENTION

The present invention relates to methods, systems, apparatus, and computer software/program code for determining an improved placement or movement of virtual machines hosted on a set of virtualized computing systems, in order to achieve more balanced utilization of the virtualized computer system components, and in which the determination is made on the basis of performance measurements of the set of virtualized computer systems and/or virtualized computer system components.

BACKGROUND OF THE INVENTION

In computing systems that provide multiple computing, network and storage resources, multiple programs can typically run concurrently. Any one of the programs sharing the computing resources can impede the performance of any other program, unless a policy is in place that allows the effective sharing of resources. Many operating systems provide a facility for dynamically monitoring and allocating system resources to individual programs running on the system. Typically, such an operating system will attempt to allocate resources based on the associated priority of each program, as well as the current system load.

However, when virtualization is utilized, it becomes more difficult to balance system resources. A single Virtual Machine Monitor (VMM) can host multiple virtual machines, each with its own operating system and set of applications. The individual virtual machines typically have little knowledge of the other virtual machines running in this environment. The VMM is thus tasked with maintaining balance between the multiple virtual machines running on the shared system resources, but in typical, conventional virtualized computing environments, the ability of the VMM to achieve such a balance is compromised.

SUMMARY OF THE INVENTION

The present invention provides methods, systems, apparatus and computer software/program code products adapted for operating in, or in conjunction with, otherwise conventional computing systems (such as depicted in FIG. 1), and which enable evaluating and monitoring performance of computer systems, and the utilization of performance measurements to determine an advantageous placement or movement of virtual machines, mapped to specific computer systems, in a virtualized computing environment under the control of a virtualization manager.

In one aspect of the present invention, the performance of a computing system within a virtualized computing environment, or the performance of the computing system's components, is measured or evaluated, and virtual machine placement is determined on the basis of such performance measurements.

In another aspect of the present invention, a selected balance (in terms of performance or other metric capturing a unit of delivered service) of program execution on hardware resources is obtained across a set of computer systems, based on utilization or throughput measurements and the ability to move virtual machines assigned to physical computer systems.

In another aspect of the present invention, virtual machine placement can be "tuned" on the basis of one or more different utilization/throughput factors, including use of processors, memory, networks and input/output resources.

In a further aspect of the present invention, individual elements without a subsystem, such as storage adapters, storage processors, or switch ports, can be assigned and reassigned to service a set of virtual machines, in order to provide better balance across the entire system.

A further aspect of the present invention relates to the efficiency of the selected placement selection algorithm. As a general matter, to arrive at the best possible configuration, typically all possible virtual machine placements would need to be explored. However, for improved efficiency and resource utilization, one implementation of the invention described herein presents a "Greedy Algorithm" approach, which leads to a result close to the optimal placement in most cases. Moreover, the use of a "Greedy Algorithm" allows this placement algorithm to be applied repeatedly and frequently, without overwhelming system resources.

More particularly, one aspect of the invention comprises methods, systems and computer program code (software) for determining an optimized placement or movement of virtual machines and their associated workloads hosted on at least one virtualized computing system, including the determining of virtual machine placement based on measurement of performance, utilization or other selected values of the at least one virtualized computing system or at least one component of the at least one virtualized computing system.

The determining of virtual machine placement includes determining a selected balance of program execution on selected resources in the at least one virtualized computing system, or a selected balance of another selected parameter associated with selected resources in the at least one virtualized computing system.

The determining of a selected balance is based on (i) any of utilization, throughput, or other measurements, and (ii) detected capacity to move virtual machines assigned to at least one physical computing system associated with the at least one virtualized computing system.

The methods, systems and computer program code (software) can also include one or more of the following:

(1) adjusting or tuning virtual machine placement based on selected utilization or throughput values, or other selected values, the utilization or throughput values comprising use of any of processors, memory, networks and input/output resources;

(2) assigning or reassigning individual elements of the computing system to service a set of virtual machines, to provide improved balance across the at least one virtualized computing system, based on selected utilization or throughput values, or other selected values, the utilization or throughput values comprising use of any of processors, memory, networks and input/output resources, the individual elements comprising any of storage adapters, processors, or switch ports; and/or (3) utilizing a selected optimization algorithm to determine virtual machine placement, one type of such an algorithm being a "greedy" algorithm.

The measurements utilized in conjunction with the invention can include measurement of at least one selected resource, wherein the at least one selected resource can include one or more of CPU utilization, memory utilization, network bandwidth, I/O storage bandwidth, or other selected parameters.

In one aspect of the invention, the methods, systems and computer program code (software) comprise the following:

utilizing a virtual machine monitor element or process (VMM) in communication with the selected resources or components, to capture performance or utilization measurements across a plurality of virtual machines;

mapping respective measurements of each of a plurality of virtual machines corresponding to a given VMM to a table stored in at least one memory element, the table setting forth performance or utilization values for respective ones of the virtual machines corresponding to the given VMM;

computing, using a computer processor, a balance comprising the sum of performance or utilization values mapped to a given VMM;

comparing, using a computer processor, a set of computed balances, each corresponding to a given VMM in a set of VMMs, to detect differences in the computed balances corresponding to respective VMMs; and executing, using a computer processor, a set of defined transformations to attempt to reduce the detected differences to zero, or as close as possible to zero, thereby to define virtual machine movement yielding an optimized configuration of virtual machines.

Those skilled in the art will appreciate that the invention can be implemented using software, a software appliance, or as a virtual machine (i.e., a software implementation of a computer that executes instructions like a physical machine).

The present invention can be used to balance execution on a set of either homogeneous or heterogeneous computing systems that are managed by virtualization software or other VMM structures or layers.

Each of these aspects will be discussed in greater detail below, along with various examples, embodiments and practices of the present invention.

Those skilled in the art will appreciate that while the following detailed description provides sufficient detail to enable one skilled in the art to practice the present invention, the various examples, embodiments and practices of the present invention that are discussed and described below, in conjunction with the attached drawing figures, are provided by way of example, and not by way of limitation. Numerous variations, additions, and other modifications or different implementations of the present invention are possible, and are within the spirit and scope of the invention.

BRIEF DESCRIPTION OF DRAWINGS

The present invention will next be described in the following Detailed Description section in conjunction with the attached drawing figures, in which:

FIGS. 6-13 are schematic diagrams depicting the mapping of virtual machines to virtualized systems, and details of one practice of a placement method, or embodiment of a placement system, that balances resource usage on each virtualized system in accordance with the present invention.

FIG. 14 is a schematic diagram depicting the placement of virtual machines before and after placement is performed in accordance with the present invention.

FIGS. 15A-15B and 16 are flowcharts of general techniques according to aspects of the invention.

DETAILED DESCRIPTION OF THE INVENTION

The following Detailed Description is organized into the following sections:

A. Introduction
B. Virtual Machine Placement in Accordance with the Invention
C. Examples of the Present Invention
D. General Techniques in Accordance with the Invention
E. Digital Processing Environments in Which the Invention Can Be Implemented
F. Conclusion A. Introduction Described herein are methods and systems that enable more efficient load balancing in virtualized computing systems. According to the described methods and systems, the current load/performance of components or subsystems in a virtualized computing system are evaluated or measured, and the performance measurements are utilized to determine an optimized placement or movement of virtual machines within the virtualized computing system. The described methods and systems thereby provide better balance within the virtualized system.

Figure 1:
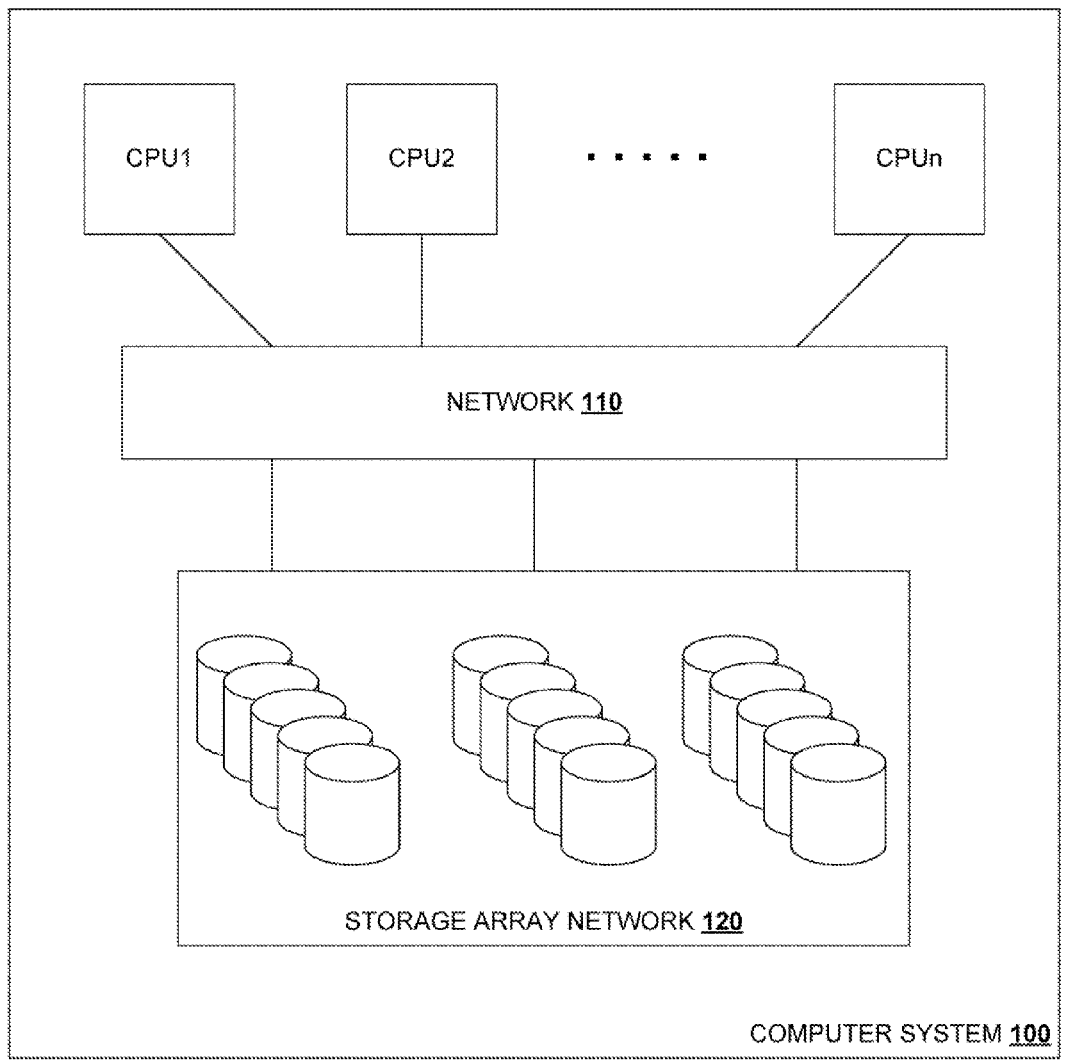
FIG. 1 is a schematic diagram depicting general aspects of a conventional computing system typical of the prior art.

By way of example, FIG. 1 is a schematic diagram depicting general aspects of a conventional computing system 100. System 100 includes a Storage Array Network (SAN) 120, a Network 110 (such as a Local Area Network (LAN), Wide Array Network (WAN) or other form of network(s), and a number of Central Processing Units CPU1, CPU2, . . . CPUn. It will be appreciated from the present description that aspects of the invention may be practiced using other systems configurations and components.

Figure 2:
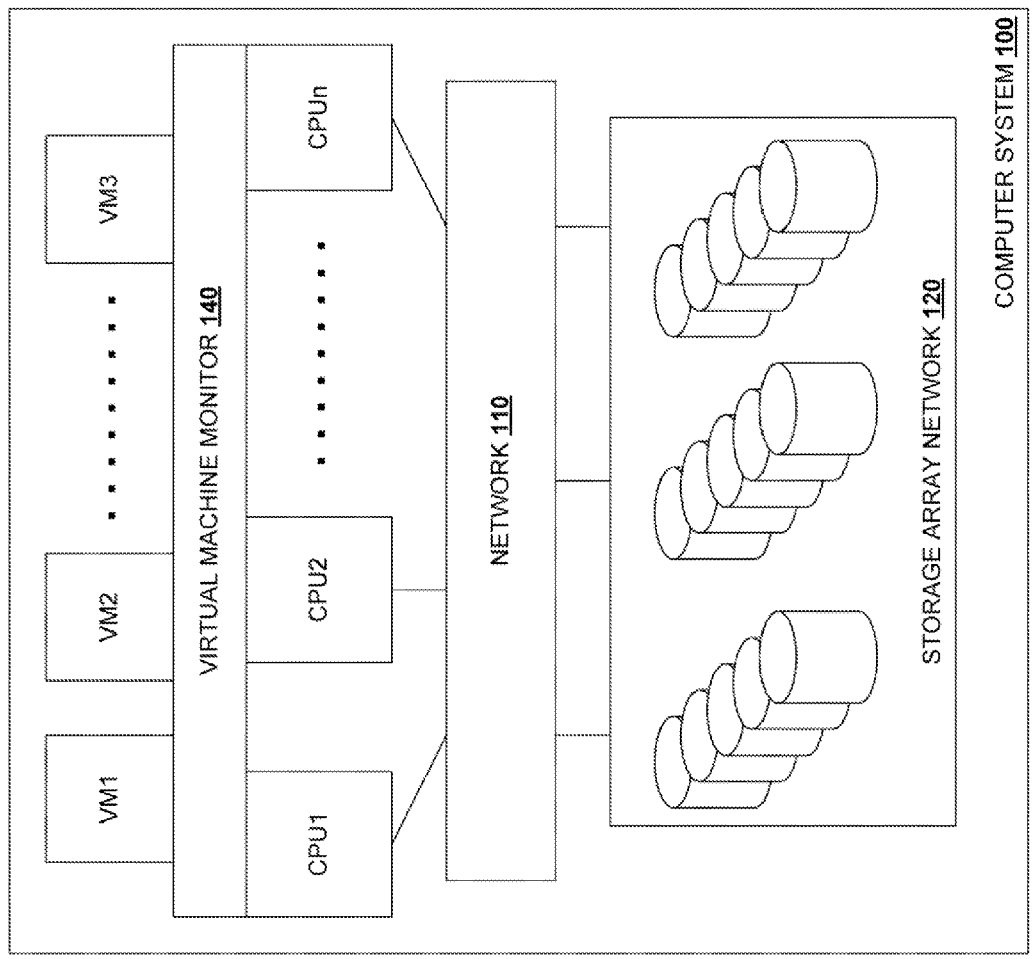
FIG. 2 is a schematic diagram depicting the introduction of a layer of virtualization software and the presence of multiple virtual machines running on top of the virtual machine monitor (VMM) running on a physical hardware system such as that depicted in FIG. 1.

A computing system 100 such as that depicted in FIG. 1 can typically run any number of virtualization software applications or environments. FIG. 2 depicts a possible configuration of the computing system 100 of FIG. 1, in which system 100 is configured as a host to a plurality of guest virtual machines VM1, VM2, . . . VMn. In the FIG. 2 configuration, a Virtual Machine Monitor (VMM) 140 is installed on top of central processing units CPU1, CPU2, . . . CPUn, and hosting virtual machines VM1, VM2, . . . VMn.

Figure 3:
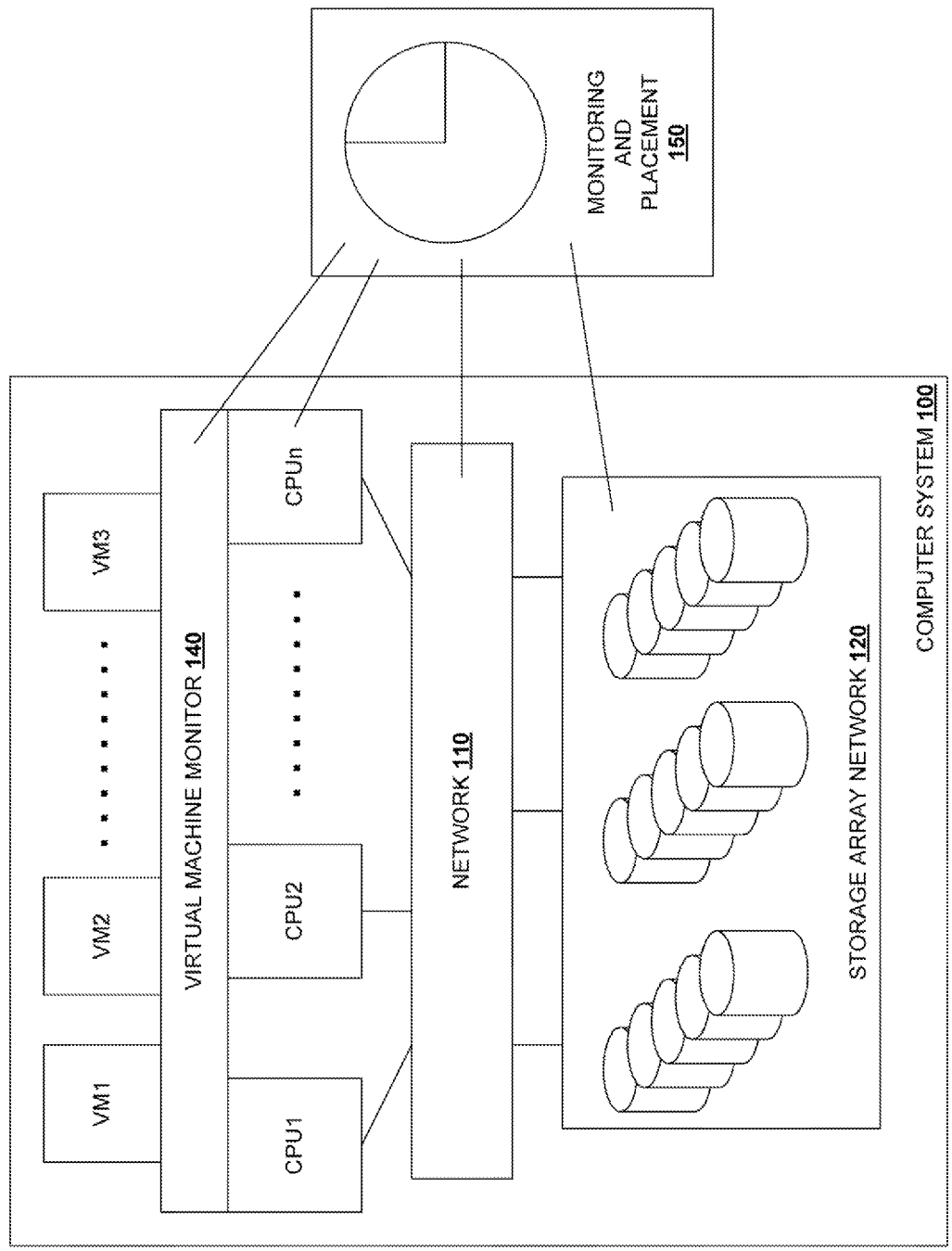
FIG. 3 is a schematic diagram in which a VMM monitor component has been connected to selected components of the system of FIG. 2, and wherein component 150 includes the ability to perform placement or movement of virtual machines (VMs) mapped to the VMM.

FIG. 3 illustrates an aspect of the present invention that provides systems and techniques for monitoring, or predicting aspects of performance of a computing system such as that shown in FIGS. 1 and 2, or the performance of individual elements or groups of elements in the computing system, such as a SAN 120, Network 110, or central processing units CPU 1, CPU2, . . . CPUn. According to a further aspect of the invention, the described systems and techniques measure or evaluate the performance associated with a computing system such as that shown in FIG. 1, and virtualized configurations such as that depicted in FIG. 2.

In FIG. 3, the functions of monitoring and predicting the performance of the computing system, or elements of the computing system, as well as and corresponding devices, systems or computer software/program code products adapted for providing such functions, are represented schematically by performance monitoring meters, elements, modules or function 150. Also in FIG. 3, element 150 is shown in communication with the various elements of the computing system of FIG. 3, including SAN 120, network 110, or central processing units CPU1, CPU2, . . . CPUn.

B. Virtual Machine Placement in Accordance with the Invention

The concept or definition of a "balance" is central to the present invention, and as used herein, the term "balance" is employed in the context of load balancing within a virtualized computing system. Some conventional operating systems provide for load balancing with respect to job scheduling and resource allocation. As used in connection with the presently described systems and techniques, however, the maintenance or attainment of "balance" refers to systems and techniques by which better usage of computational resources is achieved by allocating work as evenly as possible to the available resources in a virtualized computing system. Balance in the context of the present invention can be measured in terms of system component load or latency.

A number of different configurations relating to virtualized computing systems are known in the prior art. By way of example, U.S. Pat. No. 7,318,136 describes a method and apparatus to perform data migration in a storage system, and the use of virtualization to provide this type of migration without the knowledge of the system utilizing the storage. It is noted, however, that while U.S. Pat. No. 7,318,136 purports to describe the use of virtualization to allow for the transparent migration of storage from one set of storage resources to another, it does not describe this movement in the context of improving system performance. In addition, unlike U.S. Pat. No. 7,318,136, the present invention is intended to improve the performance of virtualized computing systems that include CPUs, memory and other subsystems, and not just storage systems.

In addition, it is noted that U.S. Pat. No. 7,318,136 purports to describe the ability to migrate data in a virtualized environment, but does not suggest the migration of virtual machines, or a method or system to determine how to guide the migration process. Unlike U.S. Pat. No. 7,318,136, the present invention is directed to aspects including the selection of one or more particular virtual machines (not merely data) for migration, and where to place the migrated virtual machine to obtain better balance of system resources.

It is also noted that U.S. Pat. No. 6,795,966 describes a mechanism for checkpointing and replication on virtualized computer systems. U.S. Pat. No. 6,795,966 does not describe which virtual machine or application among a set of virtual machines or applications should be checkpointed, nor does it suggest how to determine an optimized placement or movement of a virtual machine. The present invention, in contrast, can be implemented independently of any particular mechanism used to move virtual machines to different virtualized system resources.

As applied to the context of balancing performance on a conventional computer system, the present invention provides a mechanism for balancing the performance of potentially many virtual machines that are mapped onto a number, potentially a large number, of system resources. A significant technical advantage of the present invention is that this balancing can be executed even when the system is running a virtualization software.

The present invention uses a computed balance metric to decide how best to place virtual machines to improve system performance. While certain described aspects of the present invention focus on performance, the balance metric described herein, or variants thereof, can also be used for other purposes, such as reducing power consumption by packing virtual machines on fewer physical resources.

C. Examples and Embodiments of the Invention

We next provide detailed examples of the present invention, in connection with the attached drawings.

Figure 4:
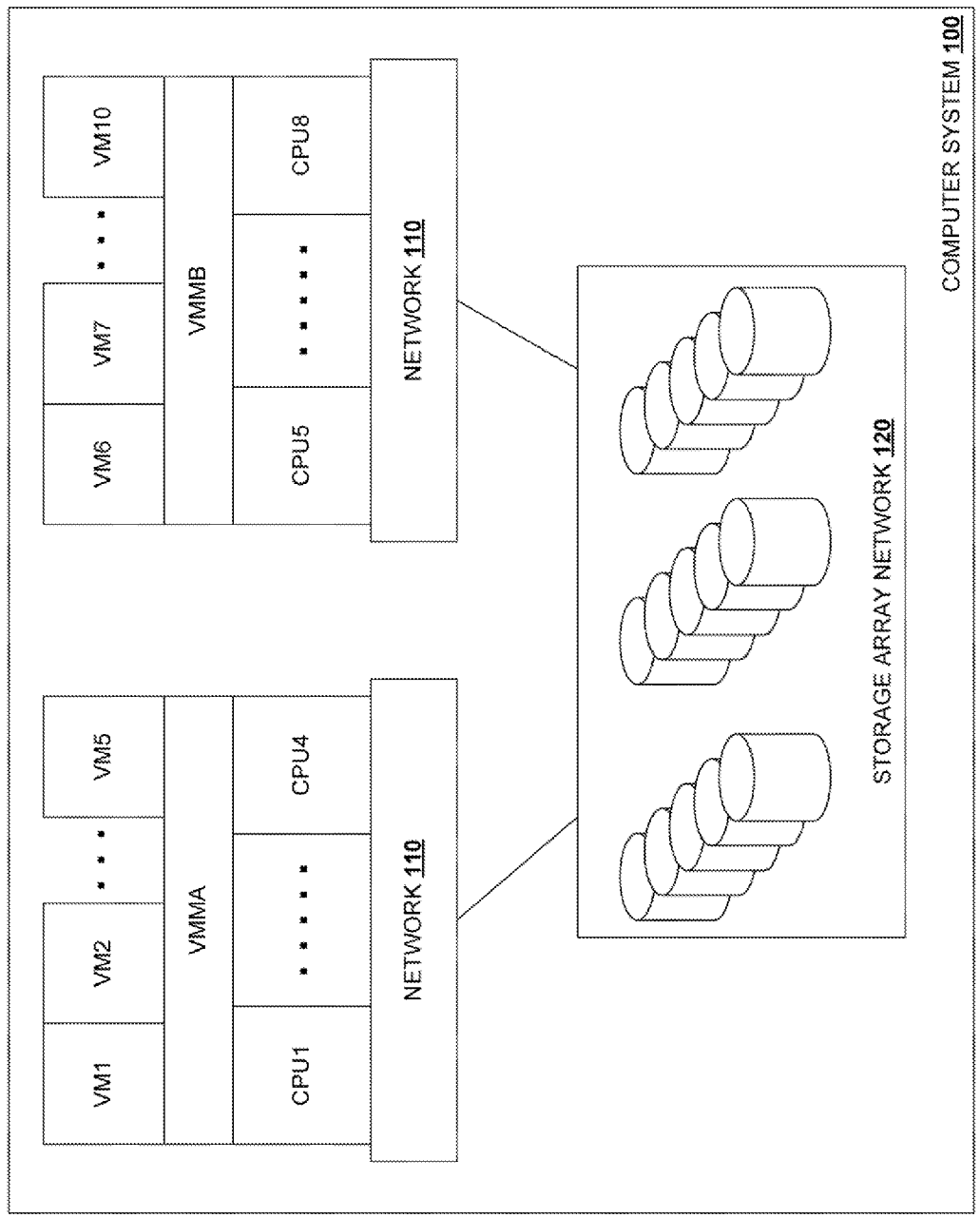
FIG. 4 is a schematic diagram depicting two of the systems of FIG. 2, each system equipped with its own virtualization software and set of virtual machines running on top of the virtualization layer.

Referring now to FIG. 4, there is shown a schematic diagram depicting exemplary system 100 with first and second sets of central processing units CPU1-4 and CPU5-8 connected into network 100. Each set of CPUs is equipped with its own virtualization software VMMA and VMMB and set of virtual machines (VM1-5 and VM6-10) running on top of the virtualization layer.

FIG. 4 presents a typical organization of system elements such as CPUs, Networks and Storage Arrays. The arrangement shown in FIG. 4 is just one possible arrangement of system resources over which the present invention will operate, and it is noted that the present invention does not depend upon a specific arrangement of these resources. Further, additional resources such as network attached storage, co-processors, flash memory, or other elements typically found on traditional information processing systems could also be present.

The present invention provides the ability to utilize performance measurements made on the virtualized system, and to determine or suggest how to rearrange virtual machines and their associated workloads to provide improved resource utilization in the system. The present invention enables the decision to move virtualization machines to be based on different performance indices. While the following examples describe embodiments of the present invention utilizing a specific set of performance indices, additional indices can be used to balance load or for other purposes (such as the reduction of power consumption).

In the examples that follow, a primary measured or evaluated resource can be CPU utilization, memory utilization, Network bandwidth, I/O storage bandwidth, or other resources present in computing systems. Multiple resources can be used either to produce a single performance index, or for tie-breaking.

Figure 5:
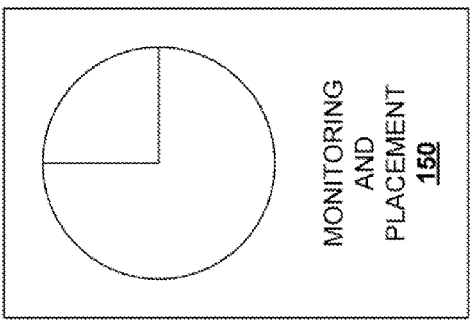
FIG. 5 is a schematic diagram depicting the virtual machines and virtualization layers running on the system shown in FIG. 4, with a monitor component that collects information about each of the virtual machines present in the two interconnected systems and shows exemplary resource usage values for each virtual machine.

In describing the operation of one embodiment of the invention, we begin with FIG. 5. FIG. 5 is a schematic diagram depicting the virtual machines and virtualization layers running on the system shown in FIG. 4, with a monitor component 150 that collects information about each of the virtual machines present in the two interconnected systems 140 and 141 and shows the resource usage values 151 and 152 of each virtual machine. Monitor component 150 may be implemented using any of a number of different computational structures and environments including software, a software appliance, a virtual machine, or the like.

More particularly, FIG. 5 shows a first set of five virtual machines VM1-VM5 mapped to a first virtual machine monitor VMMA and a second set of five virtual machines VM6-VM10 mapped to a second virtual machine monitor VMMB.

As described in further detail below, the monitoring and placement system 150 uses resource usage statistics to determine how to move virtual machines VM1-VM10 to VMMA and VMMB. Tables 151 and 152 illustrate exemplary resource usage statistics utilized by the monitoring and placement system 150 for virtual machine monitors VMMA and VMMB, respectively.

FIGS. 6-13 show a series of tables 160*a*-160*y* illustrating a load balancing technique according to a practice of the invention. It will be appreciated that the number of virtual machines, virtual machine monitors, and virtual machine mappings, as well as the configuration of the tables and the values for the table entries have been arbitrarily chosen for the purposes of discussion, and that it would be possible to practice aspects of the invention in other contexts.

In FIG. 6, table 160*a* depicts the initial resource usage statistics for virtual machines VM1-VM10. Row 1 sets forth the statistics for virtual machines VM1-VM5, which are initially mapped to VMMA, and Row 2 sets forth the statistics for VM6-VM10, which are initially mapped to VMMB.

The system computes a "balance," the respective sum of the resources mapped to a given VMM. As shown in table 160*b* (FIG. 6, middle), VMMA has a load of 93, and VMMB has a load of 71. This is a difference, or imbalance, of 22. In accordance with the described embodiment of the present invention, the goal is to try to reduce this imbalance from its starting value of 22 to an ending value of 0, or close to 0, by following a set of prescribed transformations.

It should be noted that a "balance" may be determined using techniques other than simply summing the selected performance or utilization values. Such other techniques may include, for example, computing standard deviations and other statistical measures. These techniques for determining a balance are collectively referred to herein as an "aggregation" of the selected performance or utilization values.

There is now described a balancing technique. For the purposes of speed and efficient use of computational resources, the presently described practice of the invention incorporates a "greedy" algorithm, comprising a number of stages at which a locally optimal choice is made.

First, according to a presently described practice of the invention, a column of zeroes is added to table 160*a* (FIG. 6, top) to arrive at table 160*c* (FIG. 6, bottom). The column of zeroes represents a sixth mapping location for each of the virtual machine monitors VMMA and VMMB. Adding a sixth mapping location allows for the possibility of balancing the load across VMMA and VMMB using a mapping in which an unequal number of virtual machines is mapped to the two virtual machine monitors, i.e., in a 4-6 or 6-4 distribution.

The columns of table 160*c* are permuted randomly, resulting in table 160*d* (FIG. 7, top). The random permuting of the table columns is performed in order to avoid biasing in the final placement of the virtual machines based on their initial placement.

Column 1 is then sorted in ascending order and Column 2 is sorted in descending order. The result of the sorting is shown in table 160*e* (FIG. 7, middle). In this case, the sorting operation has resulted in the swapping of the first and second rows in Column 1, while Column 2 retains its original ordering.

Based on this transformation, the resource usage is summed for the first two columns on a per VMM basis, as shown in 160*f* (FIG. 7, bottom). The sum of the first two columns becomes a new Column 1, and the previous Column 3 becomes a new Column 2.

The new first and second columns are again sorted, the first in ascending order and the second in descending order. In the present example, both the first and second columns retain their unsorted order, and thus table 160*f* is unchanged.

This procedure is repeated as follows:

Table 160*g* (FIG. 8, top): First and second columns of table 160*f* (FIG. 7, bottom) added together to form new first column.

Table 160*h* (FIG. 8, second from top): First two columns sorted, first column in ascending order, second column in descending order.

Table 160*i* (FIG. 8, second from bottom): First and second columns of table 160*h* added together to form new first column.

Table 160*j* (FIG. 8, bottom): First two columns sorted, first column in ascending order, second column in descending order.

Table 160*k* (FIG. 9, top): First and second columns of table 160*j* (FIG. 8, bottom) added together to form new first column.

Table 160*l* (FIG. 9, middle): First two columns sorted, first column in ascending order, second column in descending order.

The balance for the mappings represented by table 160*l* is computed in table 160*m* (FIG. 9, bottom). The value for VMMA is 85, and the value for VMMB is 79. The difference is 6, which is better than the original balance of 22 found in table 160*b* (FIG. 6, middle).

Table 160*n* (FIG. 10, top) shows the result of column-based swapping. Next, swapping between VMs in different columns is performed, as shown in table 160*o* (FIG. 10, middle), where the VM in the first row of the first column is swapped with the VM in the second row of the second column. The balance is computed in table 160*p* (FIG. 10, bottom), which now has a value of 54. The swap was not beneficial, as it is greater than the current balance value of 6. Therefore, the original VM mapping is restored as in 160*n* (FIG. 10, top), and additional swaps are attempted.

In table 160*q* (FIG. 11, top), the first row of the second column is swapped with the second row of the first column. The balance is computed in 160*r* (FIG. 11, second from top), and is found to be 20. Since this swap was not beneficial, the original VM mapping is restored as in 160*n* (FIG. 10, top), and additional swaps are attempted, e.g., as in table 160*s* (FIG. 11, bottom). Since this swap was not beneficial as shown in table 160*t* (FIG. 12, top), the original VM mapping is again restored.

Swapping is attempted between elements in column 1 and each subsequent column. If a swap is performed and is found to be beneficial, then the VM mapping is updated.

Swapping continues between column 2 and all columns to the right. Table 160u (FIG. 12, middle) presents a swap between the second row of the second column and the first row of the third column. Table 160v (FIG. 12, bottom) computes the balance, which has a value of 2. This is better than current balance value of 6, so this new mapping is used.

The best result produced thus far is shown in table 160w (FIG. 13, top). In table 160x (FIG. 13, middle), multiple iterations of swapping are VMMA1/VMMB2; VMMA5/VMMB6, and VMMA6/VMMB5, as shown. The balance is computed in table 160y (FIG. 13, bottom), which has a value of 0. The placement shown in table 160y is the best balance that can be obtained, so the algorithm stops. If a better value was not found after attempting all possible swaps, the best results found so far would be used as the final placement.

The top of FIG. 14 shows a table 180 presenting the best balance obtained using the described technique. The middle and bottom portions of FIG. 14 present, respectively, the original mapping 181, and the anal mapping 182. One aspect to note is that VMMA now has 4 VMs mapped to it, while VMMB has 6 VMs. This illustrates the value of adding a zero column as was done in table 160c (FIG. 6, bottom).

This example shows one particular implementation of the VM balance method of the present invention. Many different variations of this example could be equivalently employed, and each could utilize a different balance metric that is considered during placement.

D. General Techniques in Accordance with the Invention

Figure 16:
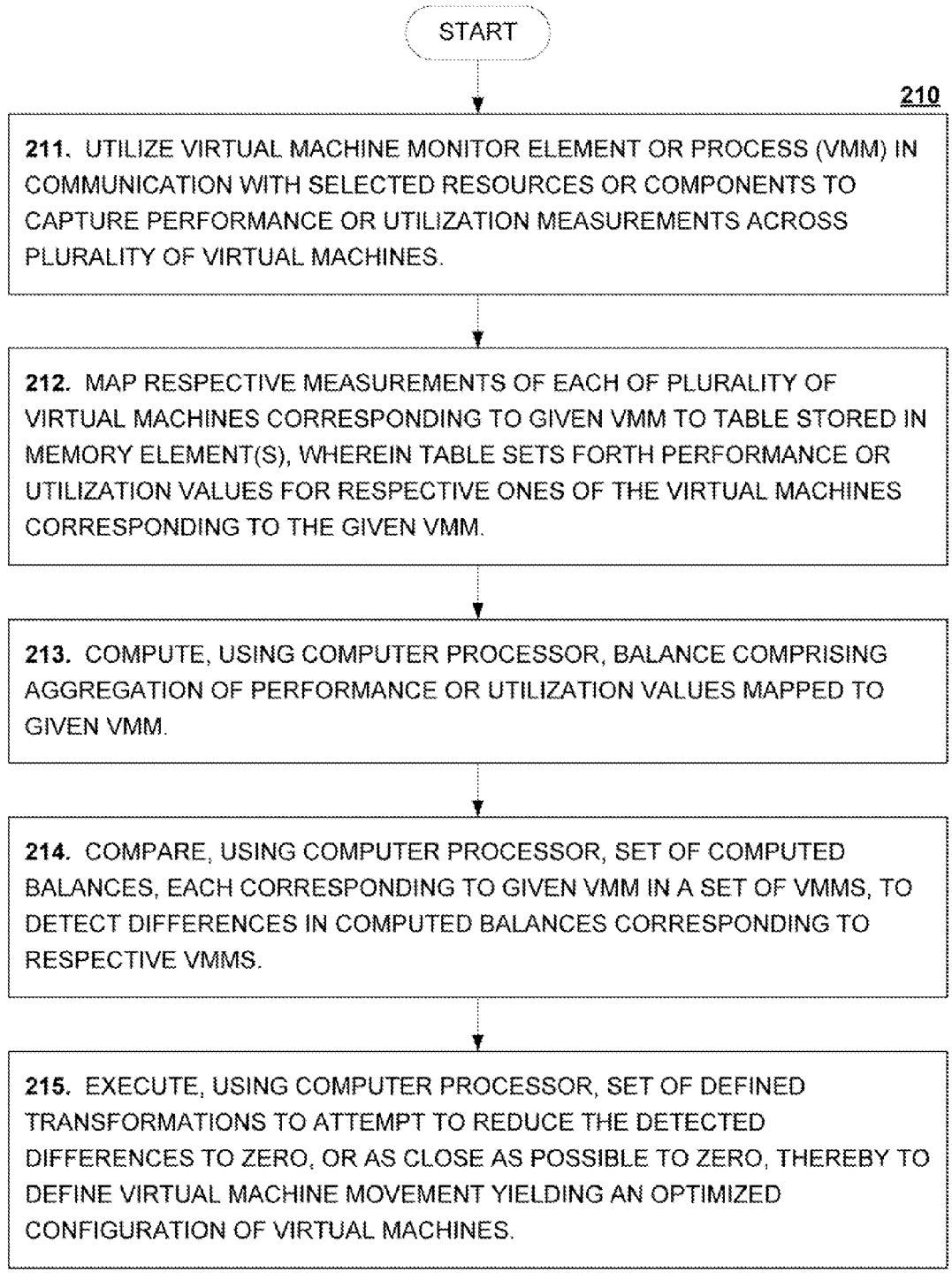

FIGS. 15A-B and 16 are flowcharts illustrating general techniques 200 and 210 incorporating various aspects of the invention described herein. These general techniques are exemplary rather than limiting. In particular, it will be appreciated that it would be possible to incorporate aspects of the invention into techniques having fewer than all of the elements of these general techniques, or having different combinations or subcombinations of the elements, either alone or in conjunction with other elements not specifically enumerated herein.

As shown in FIGS. 15A-15B, technique 200 comprises the following:

201: Determine a virtual machine placement based on measurement(s) of performance or utilization or other selected values of the at least one virtualized computing system or components or components of the at least one virtualized computing system.

As shown in the drawing, determining virtual machine placement includes determining a selected balance of program execution on selected resources in the at least one virtualized computing system, or a selected balance of another selected parameter associated with selected resources in the at least one virtualized computing system.

Determining a selected balance can be based on (i) any of utilization, throughput, or other measurements, and (ii) detected capacity to move virtual machines assigned to at least one physical computing system associated with the at least one virtualized computing system.

Measurements can include measurements of at least one selected resource, including one or more of CPU utilization, memory utilization, network bandwidth, I/O storage bandwidth, or other selected parameters.

Also in accordance with the invention, determining of virtual machine placement can include utilizing selected optimization algorithm; and the optimization algorithm can be a greedy algorithm, such as that shown in FIG. 16.

202: Assign or reassign virtual machines to individual elements of the computing system, to provide improved balance across the at least one virtualized computing system, based on selected utilization or throughput values, or other selected values. Individual elements can include any of storage adapters, processors, or switch ports.

203: Adjust or tune virtual machine placement based on selected utilization or throughput values, or other selected values. Utilization or throughput values can include the use of any of processors, memory, networks and input/output resources.

As shown in FIG. 16, technique 210 comprises the following:

211: Utilize virtual machine monitor element or process (VMM) in communication with selected resources or components to capture performance or utilization measurements across plurality of virtual machines.

212: Map the respective measurements of each of a plurality of virtual machines corresponding to a given VMM to a table stored in memory element(s). The table sets forth performance or utilization values for respective ones of the virtual machines corresponding to the given VMM.

213: Compute, using a computer processor, a balance comprising an aggregation of performance or utilization values mapped to given VMM.

As mentioned above, the aggregation of selected values may comprise various techniques, including summing, computing standard deviations and other statistical measures, and the like.

214: Compare, using the computer processor, a set of computed balances, each corresponding to given VMM in a set of VMMs, to detect differences in computed balances corresponding to respective VMMs.

215: Execute, using the computer processor, a set of defined transformations to attempt to reduce the detected differences to zero, or as close as possible to zero, thereby to define virtual machine movement yielding an optimized configuration of virtual machines.

E. Digital Processing Environments in which the Invention can be Implemented The present invention, as described herein, can be implemented in any virtualized system where virtual machines are mapped to physical machine resources. The present invention is not dependent on any specific virtualization software, performance profiling mechanism or system hardware specification. The balance techniques of the present invention can be run once, or multiple times, to arrive at a more balanced virtualized system. Additional metrics can be used when determining a balance, including performance indices and assigned shares, which are additional parameters found and readily available in many virtualization software systems.

In the example(s) discussed above, there was an implicit assumption that the physical systems had substantially identical system resources. However, the invention can also be utilized in conjunction with heterogeneous virtualized systems. If a heterogeneous system is being used, where "heterogeneity" in this instance means that each system provides a different level of resources, then the load can be normalized based on this difference. In this case, the goal is to reduce the imbalance between the normalized loads.

Various technical advantages of the present invention have been discussed herein. One particular advantage of the embodiments discussed herein is that the placement method is very fast and uses only very limited resources. If the runtime of the placement algorithm is less of a concern, a much more sophisticated placement algorithm could be deployed in accordance with the invention, that utilizes backtracking and more aggressive optimization algorithms, at the slight cost of greater resource utilization to execute the algorithm.

In a different practice of the present invention, system hardware can be reallocated to virtual machines versus actually moving the virtual machine. This can be accomplished by configuring switches (in the case of networks) and storage processors and adapters (in the case of disk storage). Any portion of a computing system that is highly reconfigurable can be reprogrammed to generate the same effect as moving a virtual machine.

In still another practice of the present invention, system power consumption could be the metric of interest, and instead of reducing imbalance across virtualized servers, the goal could be to minimize the power consumption of all systems given a particular mapping. Since power is not as deterministic as performance, the monitoring system may utilize a different algorithm for computing the system power budget given alternative mappings. By way of example, a power/load curve could be employed.

F. Conclusion

The present invention thus provides systems and methods for determining a beneficial placement for a virtual machine in a virtualized environment on the basis of available performance metrics, in which the virtualized environment includes at least two virtual machines, each hosting at least one application, and wherein the virtualized environment includes at least one virtualized hardware system managed by at least one virtualization server. The metrics can be made available or obtained on a per-virtual machine basis, and include subsystem load and response times. The subsystems can include central processing units (CPUs), memory systems, network and input/output resources. The metrics are used as inputs to a placement method that enables a determination of an optimized placement or movement of at least one virtual machine from one virtualized hardware system to another. The placement method can be run at set intervals, initiated by a system event, or run at the request of a human or machine-based system administrator, to achieve overall performance balance in the computing system.

The present invention produces an improved balance of system resources by mapping virtual machines to virtual machine monitors running on different physical hardware systems. Among other aspects and technical advantages, the present invention, as described herein, should help increase the cost effectiveness and flexibility of virtualization.

The detailed description herein illustrates examples of methods, structures, systems, and computer software products in accordance the present invention. It will be understood by those skilled in the art that the described methods and systems can be implemented in software, hardware, or a combination of software and hardware, using conventional computer apparatus such as a workstation or equivalent device operating in accordance with, or emulating, one or more conventional operating systems such as Linux, Unix or other operating system(s). The various processing aspects and means described herein may therefore be implemented in the software and/or hardware elements of a properly configured digital processing device or network of devices. Processing may be performed sequentially or in parallel, and may be implemented using special purpose or re-configurable hardware.

Those skilled in the art will understand that method aspects of the present invention can be carried out within commercially available digital processing systems, such as workstations or equivalent hardware devices, operating under the collective command of the workstation or device's operating system(s) and a computer program product configured in accordance with the present invention. The term "computer program product" can encompass any set of computer-readable programs instructions encoded on a computer readable medium. A computer readable medium can encompass any form of computer readable element, including, but not limited to, a computer hard disk, computer floppy disk, computer-readable flash drive, computer-readable RAM or ROM element, or any other known means of encoding, storing or providing digital information, whether local to or remote from the workstation, PC or other digital processing device or system. Various forms of computer readable elements and media are well known in the computing arts, and their selection is left to the implementer.

Those skilled in the art will also understand that the method aspects of the invention described herein can be executed in hardware elements, such as an Application-Specific Integrated Circuit (ASIC) constructed specifically to carry out the processes described herein, using ASIC construction techniques known to ASIC manufacturers. Various forms of ASICs are available from many manufacturers, although currently available ASICs do not provide the functions described in this patent application. Those skilled in the art will also understand that ASICs or other conventional integrated circuit or semiconductor elements can be implemented in such a manner, using the teachings of the present invention as described in greater detail herein, to carry out the methods of the present invention as shown, and/or to implement processing modules for carrying out a method in accordance with the invention.

The communication links interconnecting the computer system components in the illustrated computing systems may comprise any convenient information-carrying medium, including wires, optical fibers or other media for carrying signals among the computer systems. Those skilled in the art will understand that computer systems may transfer information over the network by means of messages, packets or data transferred over the communication links.

In addition, those skilled in the art will appreciate that numerous modifications, additions or other changes may be made to the techniques, methods and structures described herein, and will be within the spirit and scope of the present invention.

We claim:

1. A method for determining an optimized placement of virtual machines and their associated workloads hosted on at least one virtualized computing system, the method comprising:

determining virtual machine placement based on measurement of performance, utilization or other selected values of the at least one virtualized computing system or at least one component of the at least one virtualized computing system, the determining of virtual machine placement comprising determining a selected balance metric of program execution on selected resources in the at least one virtualized computing system or a selected balance metric of another selected parameter associated with selected resources in the at least one virtualized computing system, the determining of a selected balance metric being based on (i) any of utilization or throughput, and (ii) detected capacity to move virtual machines assigned to at least one physical computing system associated with the at least one virtualized computing system, the method further comprising:

utilizing a virtual machine monitor element or process (VMM) in communication with the selected resources or components, to capture performance or utilization measurements across a plurality of virtual machines;

mapping respective measurements of each of a plurality of virtual machines corresponding to a given VMM, wherein the resulting map is stored in at least one memory element and sets forth performance or utilization values for respective ones of the virtual machines corresponding to the given VMM;

computing, using a computer processor, a balance metric comprising the sum of performance or utilization values mapped to a given VMM;

comparing, using a computer processor, a set of computed balance metrics, each corresponding to a given VMM in a set of VMMs, to detect differences in the computed balance metrics corresponding to respective VMMs; and executing, using a computer processor, a set of defined transformations to attempt to reduce the detected differences to zero, or as close as possible to zero, thereby to define virtual machine movement yielding an optimized configuration of virtual machines.

2. The method of claim 1 further comprising adjusting virtual machine placement based on selected utilization or throughput values, the utilization or throughput values comprising measured utilization of any of processors, memory, networks and input/output resources.

3. The method of claim 1 further comprising assigning or reassigning at least one virtual machine to elements of the computing system, to provide improved balance across the at least one virtualized computing system, based on selected utilization or throughput values, the utilization or throughput values comprising measured utilization of any of processors, memory, networks and input/output resources.

4. The method of claim 3 wherein the elements of the computing system comprise any of storage adapters, processors, or switch ports.

5. The method of claim 1 wherein the determining of virtual machine placement further comprises utilizing a selected optimization algorithm.

6. The method of claim 5 wherein the selected optimization algorithm is a greedy algorithm.

7. The method of claim 1 wherein the measurement comprises measurement of at least one selected resource, wherein the at least one selected resource comprises at least one of CPU utilization, memory utilization, network bandwidth, or I/O storage bandwidth.

8. A system for determining an optimized placement or movement of virtual machines and their associated workloads hosted on at least one virtualized computing system, the system comprising:

means for determining virtual machine placement based on measurement of performance, utilization or other selected values of the at least one virtualized computing system or at least one component of the at least one virtualized computing system, the means for determining of virtual machine placement comprising means for determining a selected balance metric of program execution on selected resources in the at least one virtualized computing system or a selected balance metric of another selected parameter associated with selected resources in the at least one virtualized computing system, the determining of a selected balance metric being based on (i) any of utilization, throughput, or other measurements, and (ii) detected capacity to move virtual machines assigned to at least one physical computing system associated with the at least one virtualized computing system, the means for determining virtual machine placement further comprising:

a virtual machine monitor means (VMM) in communication with the selected resources or components, to capture performance or utilization measurements across a plurality of virtual machines;

means for mapping respective measurements of each of a plurality of virtual machines corresponding to a given VMM, wherein the resulting map is stored in at least one memory element and sets forth performance or utilization values for respective ones of the virtual machines corresponding to the given VMM;

means for computing a balance metric comprising the sum of performance or utilization values mapped to a given VMM;

means for comparing, using a computer processor, a set of computed balance metrics, each corresponding to a given VMM in a set of VMMs, to detect differences in the computed balance metrics corresponding to respective VMMs; and means for executing, using a computer processor, a set of defined transformations to attempt to reduce the detected differences to zero, or as close as possible to zero, thereby to define virtual machine movement yielding an optimized configuration of virtual machines.

9. A software appliance operable in a computing system to enable the computer system to determine an optimized placement or movement of virtual machines and their associated workloads hosted on at least one virtualized computing system, the software appliance comprising (1) a computer processor and (2) computer readable program instructions encoded in a computer readable medium and executable by the computer processor of the software appliance, the computer readable program instructions comprising:

computer program instructions encoded in the computer readable medium and executable by the computer processor of the software appliance to enable the software appliance to determine virtual machine placement based on measurement of performance or utilization or other selected values of the at least one virtualized computing system or components or components of the at least one virtualized computing system, the determining of virtual machine placement comprising determining a selected balance metric of program execution on selected resources in the at least one virtualized computing system or a selected balance metric of another selected parameter associated with selected resources in the at least one virtualized computing system, the determining of a selected balance metric being based on (i) any of utilization, throughput, or other measurements, and (ii) detected capacity to move virtual machines assigned to at least one physical computing system associated with the at least one virtualized computing system, the computer program instructions executable by the computer processor of the software appliance to enable the software appliance to determine virtual machine placement further comprising:

computer program instructions encoded in the computer readable medium and executable by the computer processor of the software appliance to enable the software appliance to configure a virtual machine monitor process (VMM) in communication with the selected resources or components, to capture performance or utilization measurements across a plurality of virtual machines;

computer program instructions encoded in the computer readable medium and executable by the computer processor of the software appliance to enable the software appliance to map respective measurements of each of a plurality of virtual machines corresponding to a given VMM, wherein the resulting map is stored in at least one memory element and sets forth performance or utilization values for respective ones of the virtual machines corresponding to the given VMM;

computer program instructions encoded in the computer readable medium and executable by the computer processor of the software appliance to enable the software appliance to compute a balance metric comprising the sum of performance or utilization values mapped to a given VMM;

computer program instructions encoded in the computer readable medium and executable by the computer processor of the software appliance to enable the software appliance to compare a set of computed balance metrics, each corresponding to a given VMM in a set of VMMs, to detect differences in the computed balance metrics corresponding to respective VMMs; and computer program instructions encoded in the computer readable medium and executable by the computer processor of the software appliance to enable the software appliance to execute a set of defined transformations to attempt to reduce the detected differences to zero, or as close as possible to zero, thereby to define virtual machine movement yielding an optimized configuration of virtual machines.

10. A computer program product operable in a computing system to enable the computer system to determine an optimized placement or movement of virtual machines and their associated workloads hosted on at least one virtualized computing system, the computer program product comprising non-transitory computer readable program instructions encoded in a computer readable medium, the computer readable program instructions comprising:

computer program instructions encoded in the computer readable medium and executable by the computing system to enable the computing system to determine virtual machine placement based on measurement of performance or utilization or other selected values of the at least one virtualized computing system or components or components of the at least one virtualized computing system, the determining of virtual machine placement comprising determining a selected balance metric of program execution on selected resources in the at least one virtualized computing system or a selected balance metric of another selected parameter associated with selected resources in the at least one virtualized computing system, the determining of a selected balance metric being based on (i) any of utilization, throughput, or other measurements, and (ii) detected capacity to move virtual machines assigned to at least one physical computing system associated with the at least one virtualized computing system, the computer program instructions executable by the computing system to enable the computing system to determine virtual machine placement further comprising:

computer program instructions encoded in the computer readable medium and executable by the computing system to enable the computing system to configure a virtual machine monitor process (VMM) in communication with the selected resources or components, to capture performance or utilization measurements across a plurality of virtual machines;

computer program instructions encoded in the computer readable medium and executable by the computing system to enable the computing system to map respective measurements of each of a plurality of virtual machines corresponding to a given VMM, wherein the resulting map is stored in at least one memory element and sets forth performance or utilization values for respective ones of the virtual machines corresponding to the given VMM;

computer program instructions encoded in the computer readable medium and executable by the computing system to enable the computing system to compute a balance metric comprising the sum of performance or utilization values mapped to a given VMM;

computer program instructions encoded in the computer readable medium and executable by the computing system to enable the computing system to compare a set of computed balance metrics, each corresponding to a given VMM in a set of VMMs, to detect differences in the computed balance metrics corresponding to respective VMMs; and computer program instructions encoded in the computer readable medium and executable by the computing system to enable the computing system to execute a set of defined transformations to attempt to reduce the detected differences to zero, or as close as possible to zero, thereby to define virtual machine movement yielding an optimized configuration of virtual machines.

11. The computer program product of claim 10 further comprising computer program instructions encoded in the computer readable medium and executable by the computing system to enable the computing system to adjust virtual machine placement based on selected utilization or throughput values, the utilization or throughput values comprising measured utilization of any of processors, memory, networks and input/output resources.

12. The computer program product of claim 10 further comprising computer program instructions encoded in the computer readable medium and executable by the computing system to enable the computing system to assign or reassign at least one virtual machine to elements of the computing system, to provide improved balance across the at least one virtualized computing system, based on selected utilization or throughput values, the utilization or throughput values comprising measured utilization of any of processors, memory, networks and input/output resources.

13. The computer program product of claim 12 wherein the elements of the computing system comprise any of storage adapters, processors, or switch ports.

14. The computer program product of claim 10 wherein the determining of virtual machine placement further comprises utilizing a selected optimization algorithm.

15. The computer program product of claim 14 wherein the selected optimization algorithm is a greedy algorithm.

16. The computer program product of claim 10 wherein the measurement comprises measurement of at least one selected resource, and wherein the at least one selected resource comprises at least one of CPU utilization, memory utilization, network bandwidth, or I/O storage bandwidth.

17. A software appliance operable in a computing system to enable the computer system to determine an optimized placement or movement of virtual machines and their associated workloads hosted on at least one virtualized computing system, the software appliance comprising (1) a computer processor and (2) computer readable program instructions encoded in a computer readable medium and executable by the computer processor of the software appliance, the computer readable program instructions comprising:

computer program instructions encoded in the computer readable medium and executable by the computer processor of the software appliance to enable the software appliance to determine virtual machine placement based on measurement of performance or utilization or other selected values of the at least one virtualized computing system or components or components of the at least one virtualized computing system, the determining of virtual machine placement comprising determining a selected balance metric of program execution on selected resources in the at least one virtualized computing system or a selected balance metric of another selected parameter associated with selected resources in the at least one virtualized computing system, the determining of virtual machine placement further comprising utilizing a selected optimization algorithm, wherein the selected optimization algorithm is a greedy algorithm, the determining of a selected balance metric being based on (i) any of utilization, throughput, or other measurements, and (ii) detected capacity to move virtual machines assigned to at least one physical computing system associated with the at least one virtualized computing system, the computer program instructions executable by the computer processor of the software appliance to enable the software appliance to determine virtual machine placement further comprising:

computer program instructions encoded in the computer readable medium and executable by the computer processor of the software appliance to enable the software appliance to configure a virtual machine monitor process (VMM) in communication with the selected resources or components, to capture performance or utilization measurements across a plurality of virtual machines;

computer program instructions encoded in the computer readable medium and executable by the computer processor of the software appliance to enable the software appliance to map respective measurements of each of a plurality of virtual machines corresponding to a given VMM, wherein the resulting map is stored in at least one memory element and sets forth performance or utilization values for respective ones of the virtual machines corresponding to the given VMM;

computer program instructions encoded in the computer readable medium and executable by the computer processor of the software appliance to enable the software appliance to compute a balance metric comprising the sum of performance or utilization values mapped to a given VMM;

computer program instructions encoded in the computer readable medium and executable by the computer processor of the software appliance to enable the software appliance to compare a set of computed balance metrics, each corresponding to a given VMM in a set of VMMs, to detect differences in the computed balance metrics corresponding to respective VMMs; and computer program instructions encoded in the computer readable medium and executable by the computer processor of the software appliance to enable the software appliance to execute a set of defined transformations to attempt to reduce the detected differences to zero, or as close as possible to zero, thereby to define virtual machine movement yielding an optimized configuration of virtual machines.

\* \* \* \* \*